(12) United States Patent
Palmer et al.

(10) Patent No.: US 12,006,871 B2
(45) Date of Patent: *Jun. 11, 2024

(54) FUEL DELIVERY SYSTEM FOR DELIVERING HYDROGEN FUEL TO A FUEL INJECTION SYSTEM IN A COMPLEX CYCLE GAS TURBINE ENGINE

(71) Applicant: ROLLS-ROYCE plc, London (GB)

(72) Inventors: Chloe J Palmer, Derby (GB); John R Whurr, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,311

(22) Filed: Sep. 15, 2021

(65) Prior Publication Data

US 2022/0099028 A1 Mar. 31, 2022

(30) Foreign Application Priority Data

Sep. 30, 2020 (GB) ..................................... 2015452
Sep. 30, 2020 (GB) ..................................... 2015453
Sep. 30, 2020 (GB) ..................................... 2015454
Oct. 27, 2020 (GB) ..................................... 2017014

(51) Int. Cl.
*F02C 7/224* (2006.01)
*F02C 3/20* (2006.01)
*F02C 3/22* (2006.01)
*F02C 7/04* (2006.01)
*F02C 7/14* (2006.01)
(Continued)

(52) U.S. Cl.
CPC ................ *F02C 7/224* (2013.01); *F02C 3/20* (2013.01); *F02C 3/22* (2013.01); *F02C 7/04* (2013.01); *F02C 7/14* (2013.01); *F02C 7/143* (2013.01); *F02C 7/18* (2013.01); *F02C 7/22* (2013.01); *F02C 7/222* (2013.01); *F23R 3/04* (2013.01); *F23R 3/286* (2013.01); *F02C 9/40* (2013.01);
(Continued)

(58) Field of Classification Search
CPC .... F02C 7/14; F02C 7/143; F02C 7/18; F02C 7/22; F02C 7/222; F02C 7/224; F02C 3/20; F02C 9/40
See application file for complete search history.

(56) References Cited

U.S. PATENT DOCUMENTS 665,202 A 1/1901 Gabel
2,813,672 A * 11/1957 Long ................... F04D 27/0207
137/107
(Continued)

FOREIGN PATENT DOCUMENTS

CN 106051827 A 10/2016
CN 107630767 A 1/2018
(Continued)

OTHER PUBLICATIONS

Feb. 17, 2022 Extended Search Report issued in European Patent Application No. 21196320.2.
(Continued)

*Primary Examiner* — William H Rodriguez
(74) *Attorney, Agent, or Firm* — Oliff PLC

(57) ABSTRACT

A complex cycle gas turbine engine for an aircraft with hydrogen fuel supply. The gas turbine engine comprises, in fluid flow series, a core gas turbine and a recuperator for heating hydrogen fuel prior to combustion by turbine exhaust products.

19 Claims, 20 Drawing Sheets

(51) Int. Cl.
   *F02C 7/143*    (2006.01)
   *F02C 7/18*     (2006.01)
   *F02C 7/22*     (2006.01)
   *F23R 3/04*     (2006.01)
   *F23R 3/28*     (2006.01)
   *F02C 9/40*     (2006.01)

(52) U.S. Cl.
   CPC ...... *F05D 2220/32* (2013.01); *F05D 2240/35* (2013.01)

(56) References Cited

U.S. PATENT DOCUMENTS

| | | | |
|---|---|---|---|
| 3,237,401 A | | 3/1966 | Peters et al. |
| 3,282,323 A | * | 11/1966 | Heitmann .............. F02D 1/00 137/115.03 |
| 3,489,009 A | * | 1/1970 | Ronald ................ G01L 15/00 137/809 |
| 3,688,495 A | * | 9/1972 | Fehler .................. F02C 9/32 60/741 |
| 3,720,058 A | | 3/1973 | Collinson et al. |
| 3,721,088 A | * | 3/1973 | Lewis .................. F02C 9/32 60/39.281 |
| 3,878,678 A | * | 4/1975 | Huellmantel .......... F02C 9/28 60/39.281 |
| 3,918,253 A | * | 11/1975 | Smith .................. F02C 9/32 60/39.281 |
| 4,100,733 A | | 7/1978 | Striebel et al. |
| 4,942,733 A | | 7/1990 | Hosford |
| 5,185,541 A | * | 2/1993 | Jensen .................. H02N 3/00 60/39.35 |
| 5,315,818 A | * | 5/1994 | Smith ............... G05D 16/2097 60/734 |
| 5,327,755 A | * | 7/1994 | Thompson ............ B24C 1/10 451/39 |
| 5,363,641 A | * | 11/1994 | Dixon .................. F02C 6/08 60/788 |
| 5,729,967 A | | 3/1998 | Joos et al. |
| 5,832,718 A | | 11/1998 | Suttrop |
| 6,079,222 A | | 6/2000 | Fetescu et al. |
| 7,467,467 B2 | | 12/2008 | Prociw |
| 8,042,339 B2 | | 10/2011 | Lacy et al. |
| 9,388,985 B2 | | 7/2016 | Wu et al. |
| 10,465,909 B2 | | 11/2019 | Boardman et al. |
| 10,989,117 B2 | * | 4/2021 | Roberge ............... F02C 7/12 |
| 11,041,439 B2 | * | 6/2021 | Roberge ............... F02C 3/22 |
| 11,448,133 B2 | * | 9/2022 | Cocks .................. F02C 7/36 |
| 2002/0177745 A1 | * | 11/2002 | Bullock ................ C10G 9/00 585/242 |
| 2004/0000146 A1 | | 1/2004 | Inoue et al. |
| 2004/0250797 A1 | | 12/2004 | Shetley |
| 2007/0082305 A1 | | 4/2007 | Chen et al. |
| 2007/0234565 A1 | * | 10/2007 | Prociw ................. B22F 7/004 29/890.039 |
| 2007/0277528 A1 | * | 12/2007 | Homitz ................ F23D 14/08 60/737 |
| 2008/0078160 A1 | | 4/2008 | Kraemer et al. |
| 2010/0031661 A1 | | 2/2010 | Varatharajan et al. |
| 2010/0050642 A1 | | 3/2010 | Ziminsky |
| 2010/0089066 A1 | | 4/2010 | Mina |
| 2010/0186413 A1 | | 7/2010 | Lacy et al. |
| 2010/0269507 A1 | | 10/2010 | Khan et al. |
| 2011/0016871 A1 | | 1/2011 | Kraemer et al. |
| 2011/0265488 A1 | * | 11/2011 | Lawson ................ F02C 7/232 60/39.55 |
| 2012/0117978 A1 | * | 5/2012 | Allam .................. F02C 7/141 60/783 |
| 2012/0175095 A1 | * | 7/2012 | Makhlouf .............. F28D 7/04 165/173 |
| 2014/0175803 A1 | | 6/2014 | DePuy et al. |
| 2014/0183863 A1 | * | 7/2014 | Thillen ................. F01K 7/00 290/2 |
| 2015/0322857 A1 | * | 11/2015 | Ethier .................. F02C 6/04 290/46 |
| 2016/0290650 A1 | | 10/2016 | Abd El-Nabi et al. |
| 2017/0284677 A1 | | 10/2017 | Horikawa et al. |
| 2017/0356390 A1 | * | 12/2017 | Frolov .................. F02C 6/20 |
| 2018/0128492 A1 | | 5/2018 | Boardman et al. |
| 2018/0239376 A1 | * | 8/2018 | Olberding ............ F16K 47/08 |
| 2019/0301369 A1 | | 10/2019 | Muruganandam et al. |
| 2020/0072466 A1 | | 3/2020 | Akiyama et al. |
| 2020/0088102 A1 | | 3/2020 | Roberge |
| 2020/0318548 A1 | * | 10/2020 | Zager ................... F02C 6/08 |
| 2021/0231050 A1 | * | 7/2021 | Olver .................. F15B 19/005 |
| 2021/0340908 A1 | * | 11/2021 | Boucher ............... F02C 7/224 |
| 2021/0348561 A1 | * | 11/2021 | Cocks .................. F02C 3/22 |
| 2021/0404383 A1 | * | 12/2021 | Tomescu ............... F01D 21/12 |
| 2022/0099020 A1 | * | 3/2022 | Palmer ................. F23R 3/286 |
| 2022/0163200 A1 | | 5/2022 | Miura et al. |
| 2022/0195928 A1 | * | 6/2022 | Johnson ................ F02C 7/141 |
| 2022/0297844 A1 | * | 9/2022 | Mackin ................ B64D 27/24 |
| 2022/0403777 A1 | * | 12/2022 | St-Laurent ............ F02C 6/08 |
| 2023/0014495 A1 | | 1/2023 | Fukuba et al. |
| 2023/0092811 A1 | * | 3/2023 | Palmer ................. F02C 3/22 60/39.281 |
| 2023/0167788 A1 | * | 6/2023 | Soto Carril ............ F02C 9/44 60/258 |
| 2023/0280032 A1 | * | 9/2023 | Clark ................... F02C 7/224 60/730 |
| 2023/0383694 A1 | * | 11/2023 | Palmer ................. B64D 37/30 |

FOREIGN PATENT DOCUMENTS

| | | | | |
|---|---|---|---|---|
| EP | 0638715 A1 | | 2/1995 | |
| EP | 3 168 536 A1 | | 5/2017 | |
| EP | 3 620 719 A1 | | 3/2020 | |
| EP | 3 623 360 A1 | | 3/2020 | |
| EP | 3 623 604 A1 | | 3/2020 | |
| EP | 3623602 A1 | | 3/2020 | |
| EP | 3623603 A1 | * | 3/2020 | ............... F02C 3/22 |
| EP | 3 168 536 B1 | | 6/2020 | |
| EP | 3907387 A1 | * | 11/2021 | ............... F02C 3/22 |
| FR | 2 687 433 A1 | | 8/1993 | |
| GB | 2126658 A | | 3/1984 | |
| GB | 2 240 813 A | | 8/1991 | |
| GB | 2 350 158 A | | 11/2000 | |
| GB | 2 449 267 A | | 11/2008 | |
| WO | 2014/105327 A1 | | 7/2014 | |
| WO | 2016/160010 A1 | | 10/2016 | |
| WO | 2022/018119 A1 | | 1/2022 | |

OTHER PUBLICATIONS

Database WPI, Week 201677, Thomson Scientific, London, GB; AN 2016-686843; XP002805602, & CN 106 051 827A.
Mar. 2, 2022 Extended Search Report issued in European Patent Application No. 21196324.4.
Jul. 27, 2022 Office Action issued in U.S. Appl. No. 17/487,575.
Jun. 9, 2022 Extended Search Report issued in European Patent Application No. 21196320.2.
Feb. 10, 2022 Extended Search Report issued in European Patent Application No. 21196322.8.
Feb. 11, 2022 Extended Search Report issued in European Patent Application No. 21196323.6.
Feb. 11, 2022 Extended Search Report issued in European Patent Application No. 21198180.8.
Apr. 26, 2021 Search Report issued in Great Britain Application No. 2017014.8.
Mar. 8, 2021 Search Report issued in Great Britain Application No. 2015452.2.
Mar. 26, 2021 Search Report issued in Great Britain Application No. 2015454.8.
Jan. 10, 2021 Search Report issued in Great Britain Application No. 2015453.0.
U.S. Appl. No. 17/476,110, filed Sep. 15, 2021 in the name of Carrote et al.
U.S. Appl. No. 17/476,129, filed Sep. 15, 2021 in the name of Palmer et al.
U.S. Appl. No. 17/476,174, filed Sep. 15, 2021 in the name of Carrotte et al.

(56) References Cited

OTHER PUBLICATIONS

U.S. Appl. No. 17/487,575, filed Sep. 28, 2021 in the name of Palmer.
Aug. 16, 2022 Office Action issued in U.S. Appl. No. 17/476,110.
Nov. 9, 2022 Office Action issued in U.S. Appl. No. 17/476,129.
Apr. 14, 2023 Office Action issued in U.S. Appl. No. 17/487,575.
Mar. 6, 2023 Office Action issued in U.S. Appl. No. 17/476,129.
May 12, 2023 Office Action issued in U.S. Appl. No. 17/476,110.
Jun. 1, 2023 Office Action issued in U.S. Appl. No. 17/476,174.
Oct. 13, 2022 Office Action issued in U.S. Appl. No. 17/487,575.
Oct. 18, 2022 Office Action issued in U.S. Appl. No. 17/476,110.
Oct. 25, 2022 Office Action issued in U.S. Appl. No. 17/476,174.
Feb. 10, 2023 Office Action issued in U.S. Appl. No. 17/476,110.
Feb. 17, 2023 Office Action issued in U.S. Appl. No. 17/476,174.
Mar. 2, 2023 Office Action issued in U.S. Appl. No. 17/476,129.
Sep. 13, 2023 Office Action issued in U.S. Appl. No. 17/487,575.
Jul. 3, 2023 Office Action issued in U.S. Appl. No. 17/476,129.
Nov. 14, 2023 Office Action issued in U.S. Appl. No. 17/476,129.
Feb. 14, 2024 Notice of Allowance issued in U.S. Appl. No. 17/476,129.

\* cited by examiner

SECTION II-II

FUEL DELIVERY SYSTEM FOR DELIVERING HYDROGEN FUEL TO A FUEL INJECTION SYSTEM IN A COMPLEX CYCLE GAS TURBINE ENGINE

CROSS-REFERENCE TO RELATED APPLICATIONS

This application claims priority from United Kingdom Patent Application Nos 20 15 452.2, 20 15 453.0, and 20 15 454.8, all filed Sep. 30, 2020, and United Kingdom Patent Application No 20 17 014.8 filed Oct. 27, 2020, each of which is incorporated herein by reference in its entirety.

TECHNICAL FIELD

This disclosure relates to complex cycle hydrogen-fuelled aero gas turbine engines.

BACKGROUND

In order to limit emissions of carbon dioxide, use of hydrogen as an alternative to hydrocarbon fuel in gas turbine engines has historically only been practical in land-based installations. Such engines are typically supplied with hydrogen derived from natural gas via concurrent steam methane reformation, which hydrogen is injected into large-volume series staged dry low $NO_x$ burners. This type of burner is not suitable for use in an aero engine primarily due to its size and the difficulties in maintaining stable operation during transient manoeuvres.

Experimental programmes have been conducted to develop aero engines operable to be fuelled with hydrogen, however these have typically been high-Mach afterburning turbojets or expander cycles and thus not practical for use on civil airliners operating in the Mach 0.8 to 0.85 regime.

There is therefore a need for technologies for combustion of hydrogen in aero gas turbine installations, in particular around the overall engine cycle to for example minimise fuel consumption, the fuel delivery system to for example meter fuel accurately, and the fuel injection system to for example minimise emissions.

SUMMARY

The invention is directed towards complex cycle gas turbine engines for aircraft with hydrogen fuel supply. In an aspect, one such engine comprises, in fluid flow series, a core gas turbine and a recuperator for heating hydrogen fuel prior to combustion by turbine exhaust products.

In an embodiment, the core gas turbine engine comprises:
a low-pressure spool having a low-pressure compressor driven by a low-pressure turbine;
a high-pressure spool having a high-pressure compressor driven by a low high-pressure turbine.

In an embodiment, the engine further comprises a fan driven by the low-pressure spool, optionally via a reduction gearbox.

In an embodiment, the core gas turbine comprises a combustor between the high-pressure compressor and the high-pressure turbine, the combustor having a liner cooled in a regenerative configuration by the hydrogen fuel.

In an embodiment, the engine further comprises a fuel turbine for receiving heated hydrogen fuel from the recuperator to drive a load.

In an embodiment, the load is:
an electrical generator;
a fuel pump for pumping the hydrogen fuel; and/or
a low-pressure spool or a high-pressure spool in the core gas turbine.

In an embodiment, the engine further comprises an intercooler between the low-pressure compressor and the high-pressure compressor for cooling low-pressure compressor discharge air by the hydrogen fuel.

In an embodiment, the engine further comprises a second recuperator for further heating hydrogen fuel received from the intercooler.

In an embodiment, the second recuperator is stationed downstream of the recuperator.

In an embodiment, the engine further comprises a reheat combustor.

In an embodiment, the reheat combustor is stationed between the high-pressure turbine and the low-pressure turbine.

In an embodiment, the core gas turbine engine comprises a multi-stage turbine and the reheat combustor is stationed between two of the stages on the turbine.

In an embodiment, the engine further comprises a fuel delivery system for delivering the hydrogen fuel from a cryogenic storage system to the recuperator, the fuel delivery system including a pump, a metering device, and a fuel heating system for heating the hydrogen fuel.

In an embodiment, the fuel heating system comprises a vaporiser configured to vaporise liquid hydrogen from the cryogenic storage system.

In an embodiment, the vaporiser comprises a fuel offtake for diverting a portion of the hydrogen fuel from a fuel conduit for combustion in a burner located in heat exchange relationship with the fuel conduit.

In an embodiment, the vaporiser comprises a boil volume or an electric heating element for initial heating of liquid hydrogen if no vaporised hydrogen fuel is available.

In an embodiment, the metering device is a fixed orifice and flow rate is controlled by varying the pressure ratio across the orifice.

In an embodiment, the metering device comprises a sonic fixed orifice configured to operate in a choked condition, and flow rate is controlled by varying pressure upstream of the sonic fixed orifice.

In an embodiment, the heating system comprises a heater for heating of the hydrogen fuel following metering by the metering device.

In an embodiment, the heater comprises a fuel offtake for diverting a portion of the hydrogen fuel from a fuel conduit for combustion in a burner located in heat exchange relationship with the fuel conduit.

In an embodiment, the heating system comprises one or more heat exchangers for heating the hydrogen fuel by heat from the core gas turbine.

In an embodiment, the one or more heat exchangers are oil-fuel heat exchangers for cooling engine oil or gearbox oil by the hydrogen fuel.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
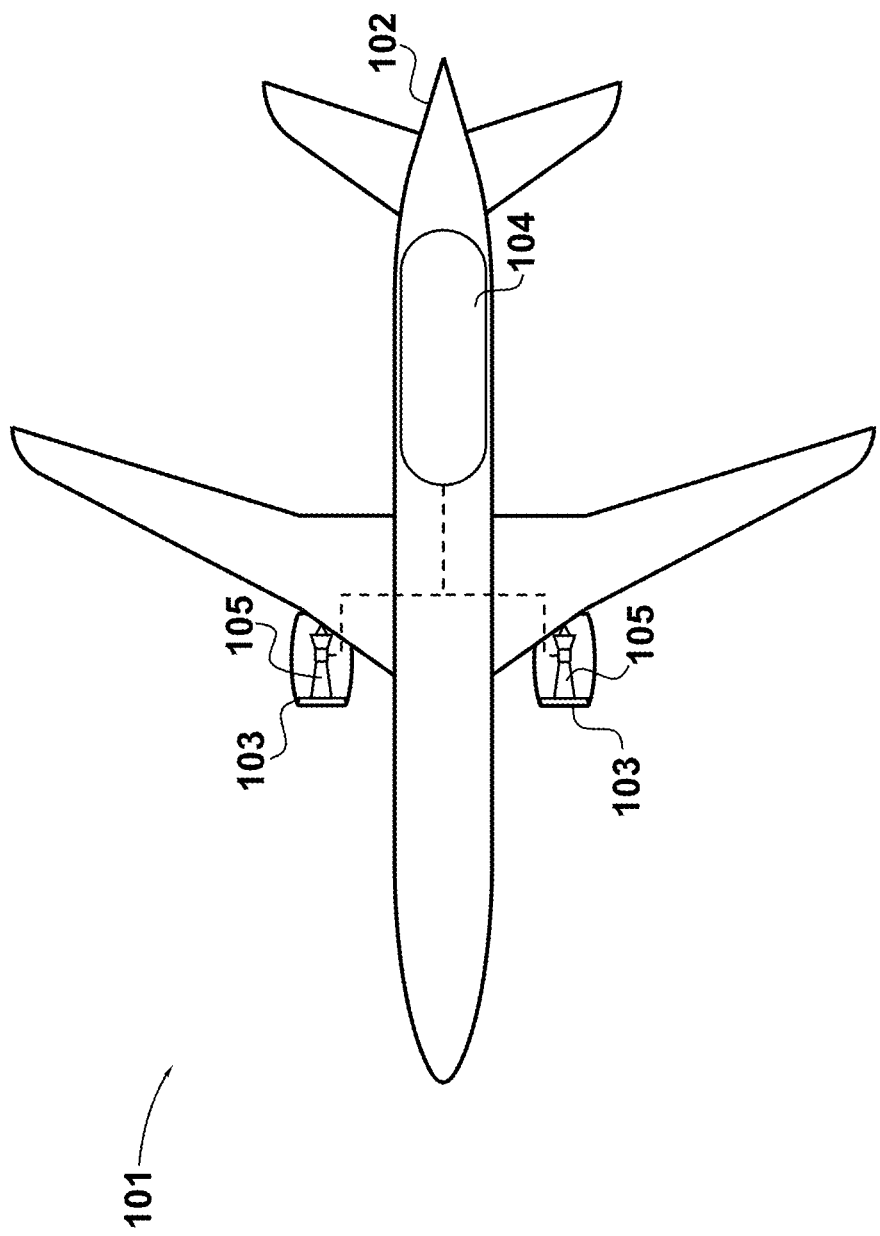
FIG. 1 shows a hydrogen-fueled airliner comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and substantially identical underwing-mounted turbofan engines 103.

In the present embodiment, the turbofan engines 103 are geared turbofan engines. A hydrogen storage tank 104 located in the fuselage 104 for hydrogen fuel supply is connected with core gas turbines 105 in the turbofan engines 103 via a fuel delivery system. In the present embodiment, the hydrogen storage tank 104 is a cryogenic hydrogen storage tank and thus stores the hydrogen fuel in a liquid state, in a specific example at 20 kelvin. In this example, the hydrogen fuel is pressurised to a pressure from around 1 to around 3 bar, in a specific example 2 bar.

Figure 2:
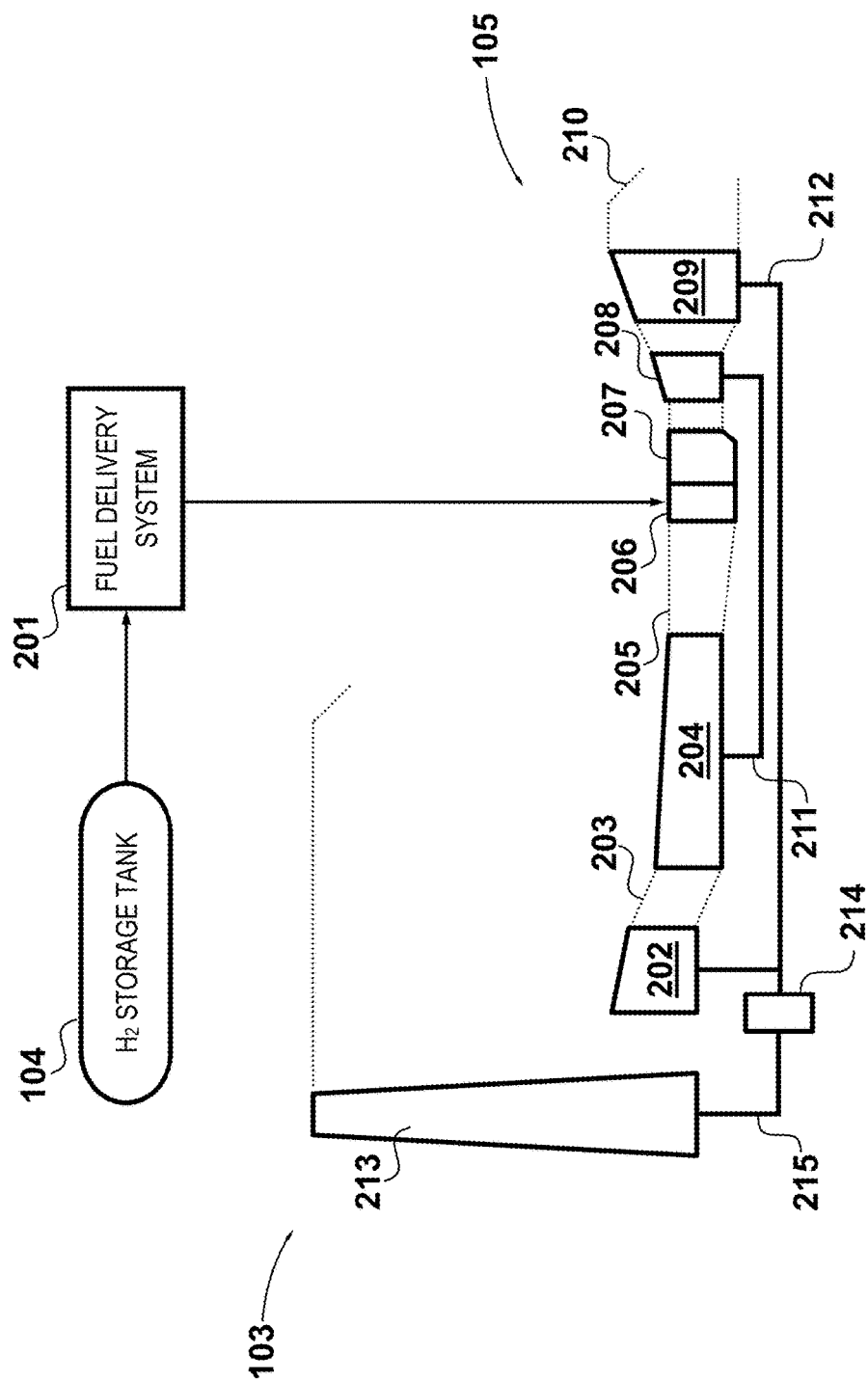
FIG. 2 is a block diagram identifying the flow of hydrogen fuel.

A block diagram identifying the flow of hydrogen fuel is shown in FIG. 2.

Hydrogen fuel is obtained from the hydrogen storage tank 104 by the fuel delivery system 201 and supplied to each core gas turbine 105. In the Figure, only one of the core gas turbines is shown for clarity. In this illustrated embodiment, the core gas turbine 105 is a simple cycle gas turbine engine.

In other embodiments, as will be described with reference to FIGS. 7 to 11, complex cycles may be implemented via fuel-cooling of the gas path.

Referring again to FIG. 2, the core gas turbine 105 comprises, in fluid flow series, a low-pressure compressor 202, an interstage duct 203, a high-pressure compressor 204, a diffuser 205, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

As will be described further with reference to FIG. 12A onward, the fuel injection system 206 may be a direct fuel injection system.

As described previously, in the present embodiment, the turbofan engines 103 are geared turbofan engines. Thus in operation the low-pressure turbine 209 drives a fan 213 via a reduction gearbox 214. The reduction gearbox receives input drive from the second shaft 212 and provides output drive to the fan 213 via a fan shaft 215. In an embodiment, the reduction gearbox 214 is an epicyclic reduction gearbox. In a specific embodiment, it is a planetary reduction gearbox. Alternatively, it may be a star reduction gearbox, or a compound epicyclic reduction gearbox. As a further alternative, the reduction gearbox 214 could be a layshaft-type reduction gearbox or any other type of reduction gearbox. It will also be appreciated that the principles disclosed herein may be applied to a direct-drive type turbofan engine, i.e. in which there is no reduction gearbox between the low-pressure turbine and the fan.

Fuel Delivery System

Figure 3:
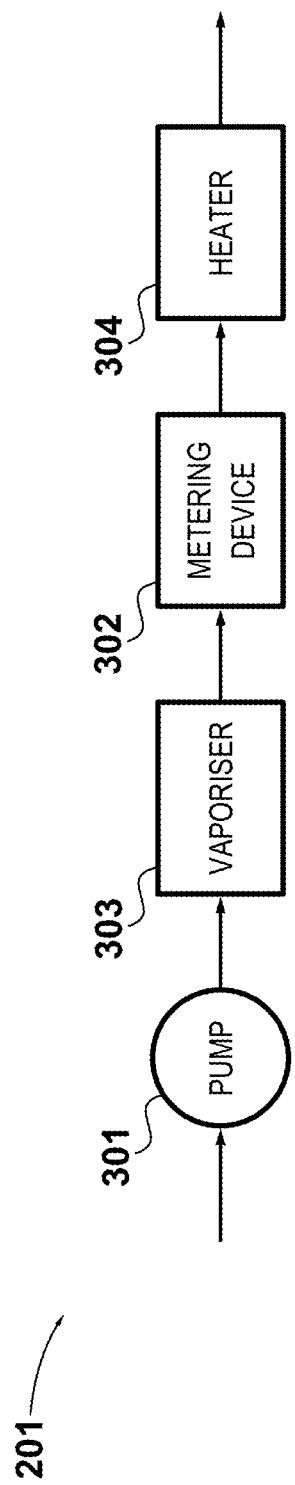
FIG. 3 shows a fuel delivery system.

In operation, the fuel delivery system 201 is configured to obtain hydrogen fuel from the hydrogen storage tank 104 and provide it to the fuel injection system 206 in the core gas turbine 105. FIG. 3 is a block diagram illustrating the fuel delivery system 201 in greater detail.

The fuel delivery system 201 comprises a pump 301, a metering device 302, and a fuel heating system for heating the hydrogen fuel to an injection temperature for the fuel injection system 206. In an embodiment, a vent system (not shown) may be included in the fuel delivery system 201 close to the fuel injection system 206 to vent hydrogen fuel should a rapid shut-off be required, for example in response to a shaft-break event. It is envisaged that the vent system may vent the excess hydrogen fuel into the bypass duct of the turbofan engine 103, or alternatively vent it outside of the nacelle of the engine 103. An igniter may be provided to flare off the excess hydrogen in a controlled manner.

In the present embodiment, the pump 301 is high-speed centrifugal pump. In a specific embodiment, it is configured to operate at 50000 rpm or more. In a specific embodiment, the centrifugal pump comprises an axial inducer to minimise the required inlet pressure and to accommodate multiphase flow in addition to the centrifugal impeller for developing the majority of the required pressure rise. In an alternative embodiment, a piston-type pump could be used.

In an embodiment, the pump 301 is located in the hydrogen storage tank 104. In this way leakage of hydrogen fuel past pump seals etc. is accommodated.

In an embodiment, the pump 301 is driven by a fuel turbine, as will be described with reference to FIG. 8.

Alternatively, the pump 301 could be driven by an air turbine supplied with compressor bleed, for example bleed from the high-pressure compressor 204. Alternatively, combustion products from the combustor 207 may be used to drive a dedicated turbine for driving the pump 301. In another embodiment, the pump 301 is driven via an electrical machine. In an embodiment, the drive means for the pump 301 are also located in the hydrogen storage tank 104.

In this embodiment, the metering device 302 is configured to meter the required quantity of fuel for the current fuel demand of the core gas turbine 105.

As will be appreciated, it is desirable to increase the temperature of the fuel from the 20 kelvin cryogenic storage condition to a temperature much closer to the firing temperature of the core gas turbine; of course this is subject to the constraint of not exceeding the autoignition temperature of the hydrogen fuel prior to admission into the combustor 207. In an example, the injection temperature is from 250 to 300 kelvin, for example 280 kelvin.

In the present embodiment, the fuel heating system comprises a vaporiser 303 for heating of the hydrogen fuel to implement a phase change. In the present embodiment, this takes place between the pump 301 and the metering device 302. In this way the metering device 302 meters gaseous hydrogen fuel. It is contemplated that in other embodiments, the order of operations may change.

In an embodiment, the vaporiser 303 is configured to raise the temperature of the hydrogen fuel to the required injection temperature. Thus, in such a configuration, the metering device 302 meters the hydrogen fuel at the injection temperature.

In another embodiment, the vaporiser 303 is configured to raise the temperature of the hydrogen fuel to a metering temperature less than the injection temperature. This could for example be from 100 to 200 kelvin, for example 150 kelvin. This reduces the risk of damage to electronic devices used for sensing temperature, pressure etc.

Further heating is implemented following the metering of hydrogen fuel by the metering device 302. In this example, this is achieved with a heater 304. The configuration of the vaporiser 303 and heater 304 may be substantially similar, and an example will be described further with reference to FIG. 10.

Additionally or alternatively, the fuel heating system may comprise one or more heat exchangers for raising the temperature of the hydrogen fuel by use of rejected heat from the core gas turbine 105. As will be described further with reference to FIGS. 7 to 11, this may be achieved by implementing a complex cycle configuration, for example fuel recuperation, intercooling, etc.

Figure 4:
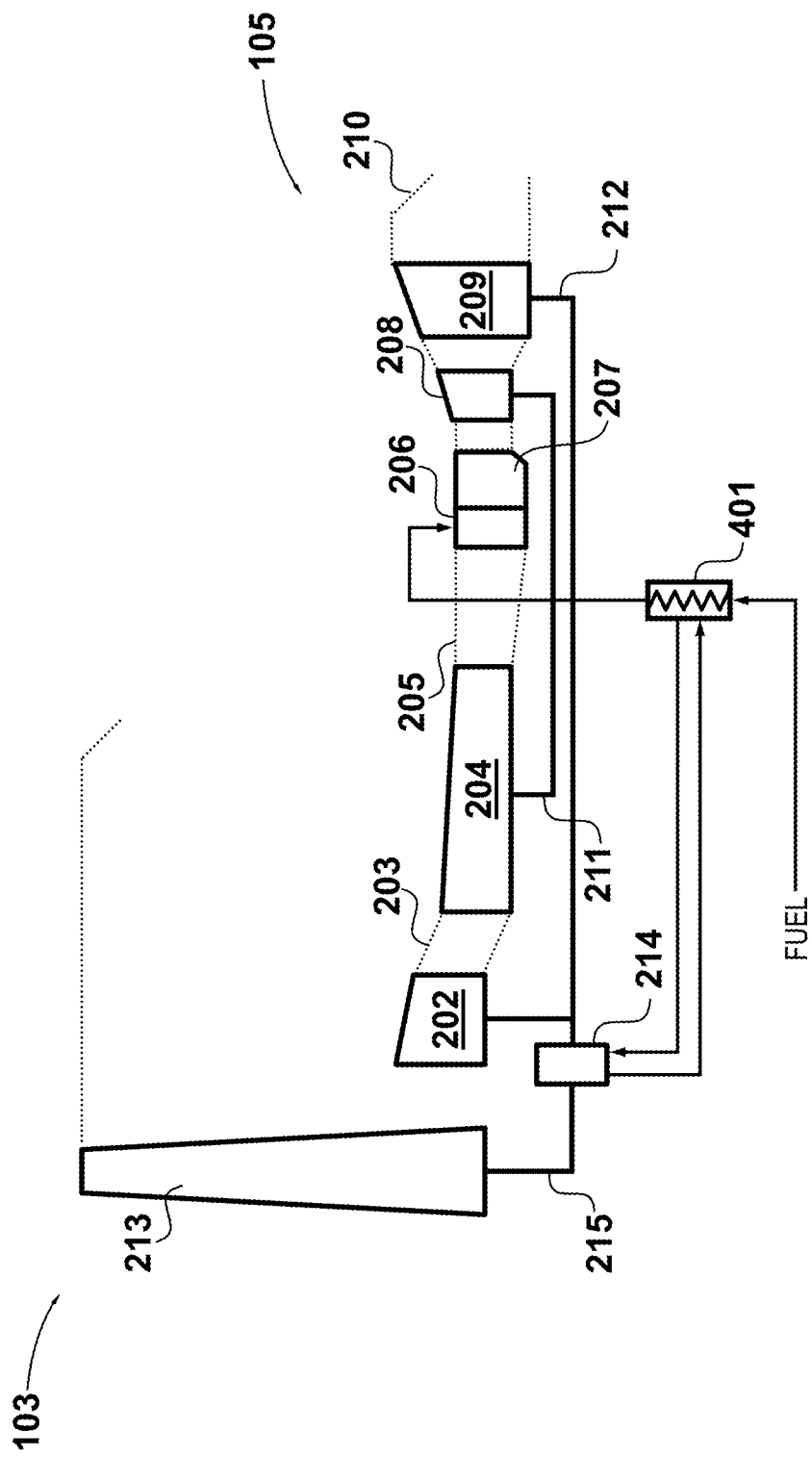
FIG. 4 shows a fuel-oil heat exchange arrangement for the fuel heating system of the fuel delivery system of FIG. 3.

However, even in a simple cycle configuration as contemplated herein, this fuel heating may be achieved by, for example, cooling one or more of the various oil systems in the core gas turbine 105. A specific example of such a configuration is shown in FIG. 4, in which the fuel heating system comprises a fuel-oil heat exchanger 401 for cooling lubricating oil from the reduction gearbox 214. In an example, even with a 99 percent efficient gearset, at maximum thrust it may still be required to reject around 750 kilowatts of heat from the gearbox oil system, which represents a significant opportunity for raising the temperature of the hydrogen fuel. It will be appreciated that other engine oil, such as main bearing lubrication oil, may also be cooled in a similar manner. It will also be appreciated that cooling air systems may be cooled in a similar manner, with high-pressure compressor 204 discharge air being cooled by heat exchange with the hydrogen fuel prior to being delivered to the high-pressure turbine 208 for cooling thereof.

In a simple cycle configuration it has been determined that due to the significant heat capacity of the hydrogen fuel, even if it is utilised as a heatsink for engine waste heat, it will still not reach the required injection temperature without implementation of the vaporiser 303 and optionally the heater 304, depending on the chosen metering temperature. Further, even in a complex cycle configuration in which the heat of combustion products is recuperated into the hydrogen fuel, it has been determined that at certain points in the operational envelope there will be insufficient heat output from the engine to raise the fuel temperature to the injection temperature. Such occasions may include, for example, ground start, in-flight relight, end of cruise idle, etc.

Figure 5:
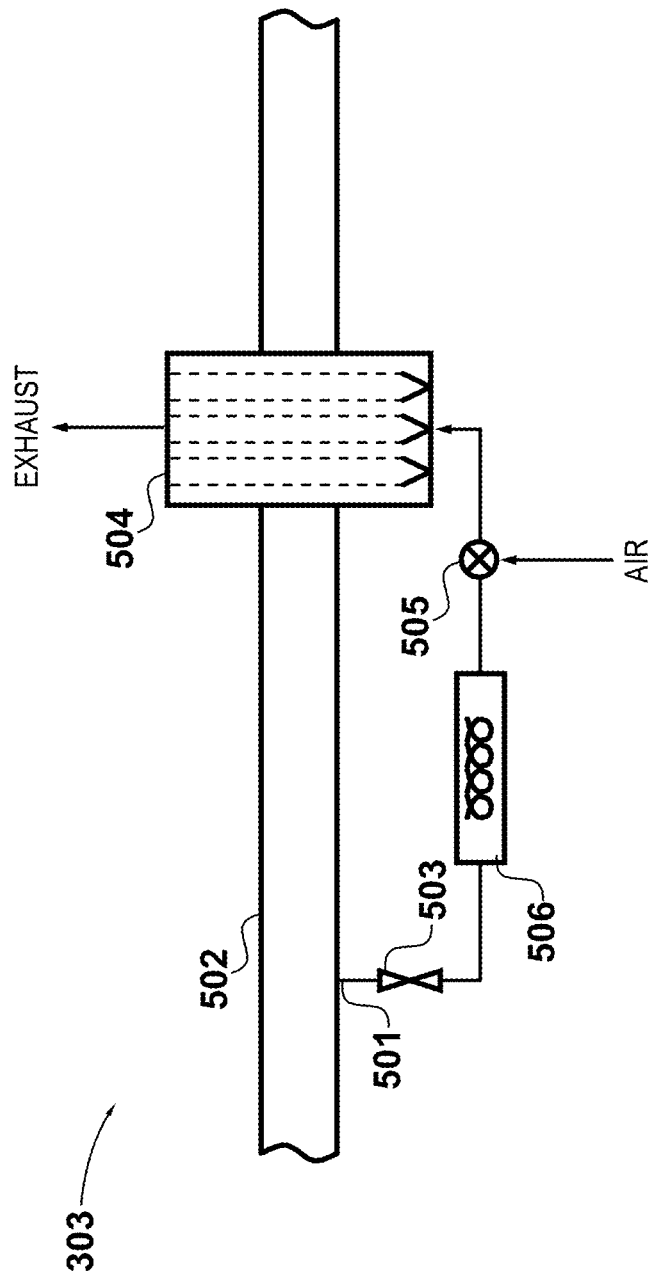
FIG. 5 shows a vaporiser of the fuel delivery system of FIG. 3.

An example configuration of the vaporiser 303 is shown in FIG. 5. Such a configuration may also be used for the heater 304.

The vaporiser 303 comprises an offtake 501 from a main fuel conduit 502. The amount of hydrogen bled from the main fuel conduit 502 is controlled by a valve 503. In operation, of the order of around 1 percent of the hydrogen fuel flow through the main fuel conduit 502 is bled for use in the vaporiser 303.

As described previously, hydrogen has very high specific and latent heat capacities; however as a gas it has a very low molecular weight and density, and thus it can be challenging to exchange heat in a compact way. Thus the vaporiser 303 vaporises the hydrogen fuel in the main fuel conduit 502 by combustion of the bled fuel in a burner 504 located in heat exchange relationship with the main fuel conduit 502. In the present embodiment, the burner 504 is concentric around the main fuel conduit 502, although it will be appreciated that other arrangements are possible.

In the present embodiment, air for combustion with the bled hydrogen fuel is bled from the high-pressure compressor 204. Alternatively, it may be bled from the low-pressure compressor 202. It will be appreciated that the air for combustion could be obtained from any other suitable location.

In the present example, the air and the bled hydrogen fuel are mixed in a premixer 505, although in alternative embodiments it may be directly co-injected into the burner with the hydrogen fuel instead. Combustion products from the burner 504 are, in an embodiment, exhausted into the bypass duct of the turbofan engine 103. Alternatively, they may be exhausted outside the nacelle.

It should be understood that, in the present example, the products of combustion from the burner 504 are not mixed with the fuel in the main fuel conduit 502. In this respect, the vaporiser 303 therefore differs from a pre-burner system as used in staged combustion cycle rocket engines.

In steady state, there is enough heat emanating from the burner 504 to ensure vaporisation of the small amount of bled hydrogen fuel. At engine start or other cold conditions for example, the vaporiser 303 comprises a preheater 506 to ensure vaporisation of the bled hydrogen fuel prior to mixing with air in the premixer 505. In a specific embodiment, the preheater 506 comprises an electric heating element, for example a coil. Alternatively, the preheater 506 could be simply configured as a boil volume, in which the ambient conditions therein contain sufficient enthalpy to boil the initial flow of bled hydrogen fuel prior to delivery to the premixer 505 and the burner 504.

Embodiments of the metering device 302 are illustrated in FIGS. 6A and 6B.

Fuel flow on a conventional liquid-fueled aero engine is typically controlled by means of a pressure regulating valve and a profiled translating spill valve which returns a proportion of the flow supplied by the pump back to the pump inlet. However, because hydrogen has an extremely low density and viscosity, it has a strong tendency to leak through any gap. A control system that relies on close clearances to minimise leakages will be highly problematic with hydrogen as the fuel, since there will be significant leakage with even very tight clearances and the significant thermal variations in a hydrogen system will preclude very tight clearances.

In the present embodiments, therefore, the metering device 302 uses a fixed orifice which inherently has no moving parts and may therefore be sealed.

Figure 6:
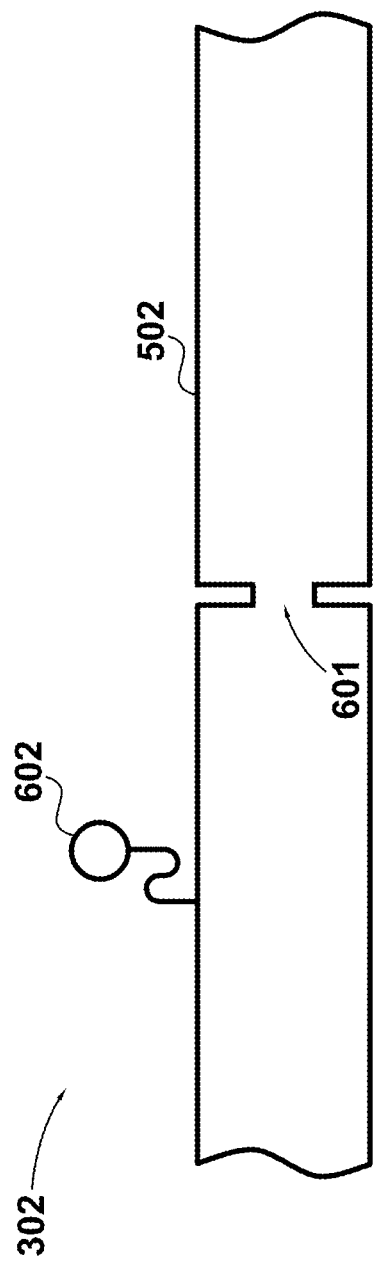
FIG. 6 shows a metering device of the fuel delivery system of FIG. 3.

A first embodiment of the metering device 302 is shown in FIG. 6 and comprises a choked sonic orifice 601 located in the main fuel conduit 302. Thus, in operation, the flow is through the orifice is choked, i.e. it has a Mach number of 1. The flow is therefore a function only of the area of the orifice and upstream pressure and temperature, measured in this embodiment by a sensor 602. In order to ensure the orifice remains choked, the orifice 601 comprises an exit with no expansion, i.e. it is sharp-edged, and the ratio of upstream to downstream pressures is set to be at least the critical pressure ratio which, for hydrogen (a diatomic gas) is around 1.9.

Flow control is then achieved simply by adjusting the upstream pressure delivered by the pump 301, the upstream temperature being measured and the orifice area being known.

As an alternative, the metering device 302 could comprise a fixed but unchoked orifice across which a pressure differential may be measured across upstream and downstream taps using an appropriate sensor. Mass flow may then be derived with knowledge of upstream and downstream pressures and temperatures and the geometry of the fixed orifice.

Complex Cycles

As described previously, it is envisaged that the fuel delivery system 201 and fuel injection system 206 may be used in an embodiment of the core gas turbine 105 implementing a simple cycle as described with reference to FIG. 2, possibly with fuel cooling of engine or gearbox oil or cooling air. Alternatively, the core gas turbine engine 105 may implement a complex cycle.

Figure 7:
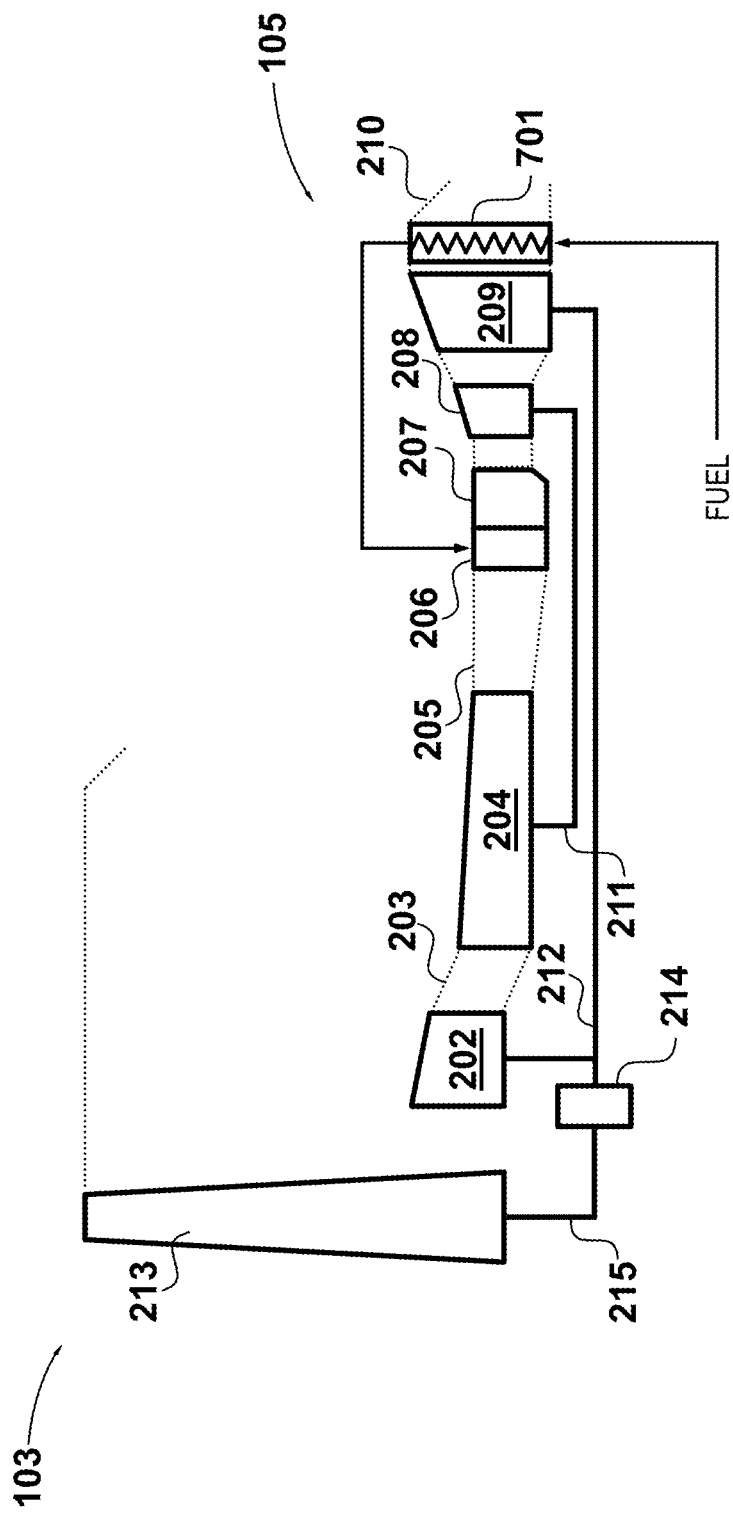
FIG. 7 shows a complex cycle including a recuperator.

A first embodiment of such a complex cycle is shown in FIG. 7 with like reference numerals used for matching features. In this example, the turbofan engine 103 and core gas turbine 105 are unchanged from their arrangement in FIG. 2, save for the addition of a recuperator 701 located between the low-pressure turbine 209 and core nozzle 210. The recuperator 701 forms part of the fuel heating system and is operable to heat hydrogen fuel by the exhaust stream of the core gas turbine 105. In this way, less fuel may be required to heat the hydrogen fuel to the injection temperature, increasing cycle efficiency.

In an embodiment, the recuperator 701 is a spiral-wound recuperator, which reduces the likelihood of fracture due to thermal expansion and contraction.

Figure 8:
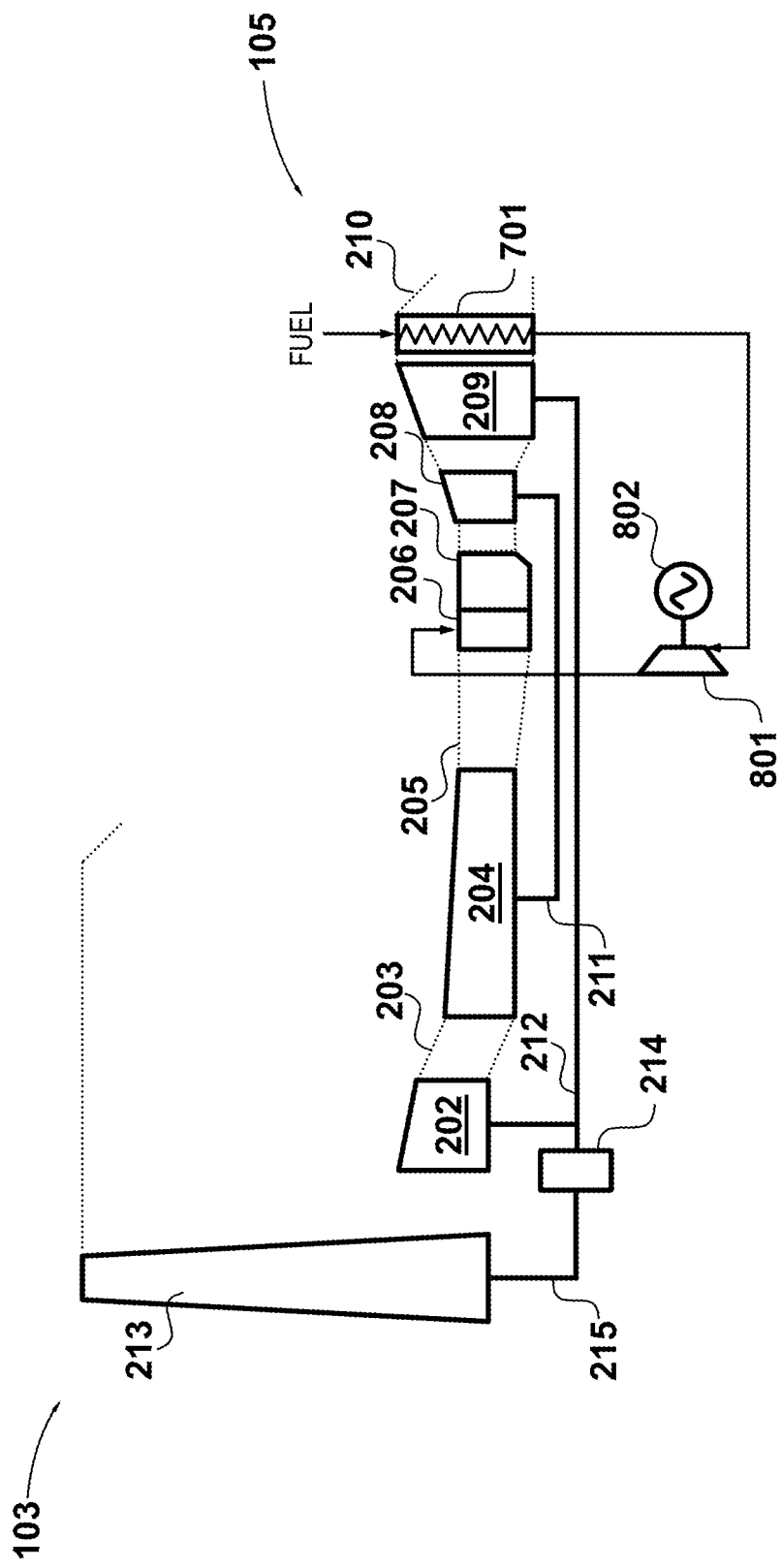
FIG. 8 shows another complex cycle including a recuperator and a fuel turbine.

Another embodiment of a complex cycle is shown in FIG. 8, which builds on the cycle of FIG. 7 with the inclusion of a fuel turbine 801. It will be appreciated that substantial energy recovery may be achieved from the exhaust stream if it is accepted that less thrust will be developed by the core nozzle 210. Thus, it is possible to heat the hydrogen fuel beyond the required fuel injection temperature and to recover work in the fuel turbine 801, which may be used to drive a load 802. In this example the load 802 is an electrical generator. In a specific embodiment, the electrical generator powers the fuel pump 301. Alternatively, the load could be the second shaft 212, with an appropriate drive mechanism being provided. In this way, the fuel turbine 801 augments the low-pressure turbine 209. It will be appreciated that other engine loads such as oil pumps etc. could also be driven by the fuel turbine 801.

Figure 9:
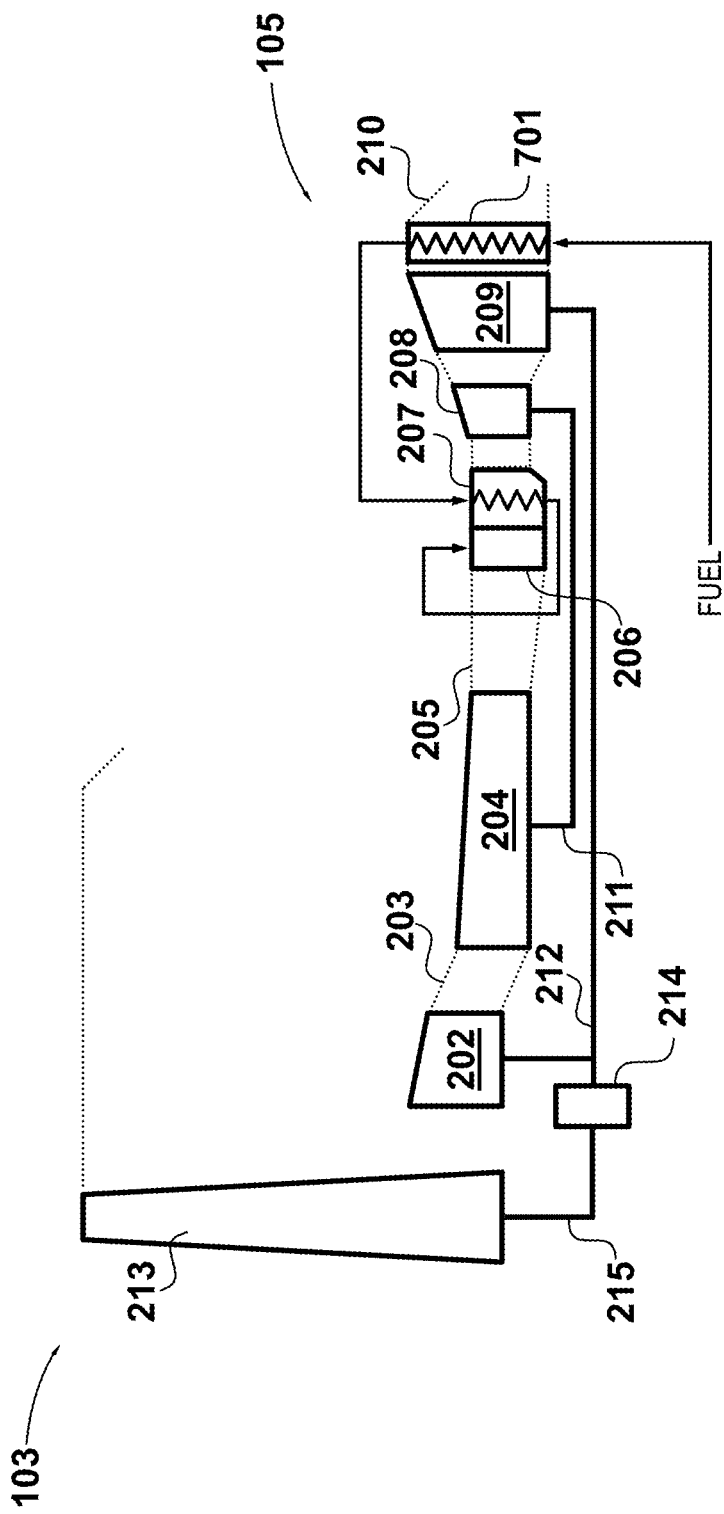
FIG. 9 shows another complex cycle including a recuperator and recuperative combustor cooling including a recuperator.

Additionally or alternatively, as shown in FIG. 9 it is possible perform further recuperation by using the hydrogen fuel to cool the combustor 207. Gas turbine combustors feature a liner needs to be cooled to maintain its mechanical integrity.

In conventional liquid-fueled aero engines the combustor liner is cooled by the airflow drawn from atmosphere and which has passed through the compression system. This is typically via a single pass system in which the air passes through holes in the liner and to enter the main heat release region. Hence this air cannot be part of the combustion process and therefore leads to an increase in emissions and a decrease in cycle efficiency.

Thus, in an embodiment, the hydrogen fuel is flowed around the liner of the combustor 207. This scheme may be achieved by provision of for example helical cooling channels around the combustor 207 through which the hydrogen fuel may flow prior to injection.

Figure 10:
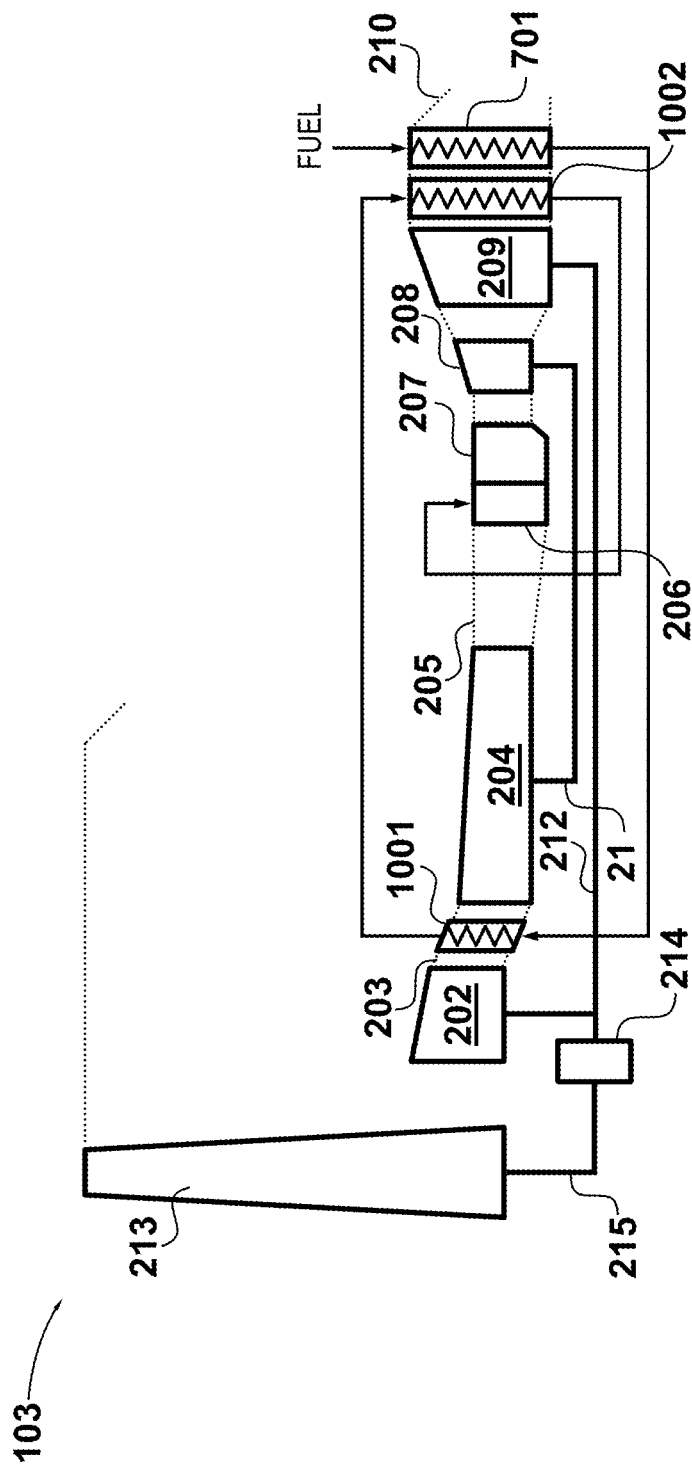
FIG. 10 shows another complex cycle including an intercooler and twin-pass recuperation.

Additionally or alternatively, as shown in FIG. 10 it is possible to provide intercooling and twin-pass recuperation.

In this embodiment, an intercooler 1001 is provided in the interstage duct 203 between the low-pressure compressor 202 and the high-pressure compressor 204 for cooling low-pressure compressor discharge air by the hydrogen fuel. In this way, the amount of compression work required to be performed by the high-pressure compressor 204 is reduced.

In this specific embodiment, a second recuperator 1002 is provided between the low-pressure turbine 209 and the recuperator 701 for further recuperative heating of the hydrogen fuel.

Thus, in this example, hydrogen fuel is first heated by the recuperator 701 to a temperature less than the low-pressure compressor 202 discharge air, which heats it further in the intercooler 1001. Further heating occurs in the second recuperator 1002, which has an inlet temperature higher than the recuperator 701. In this way, the temperature difference between the hydrogen fuel and the core gas turbine exhaust temperature is maximised in each recuperator.

Figure 11:
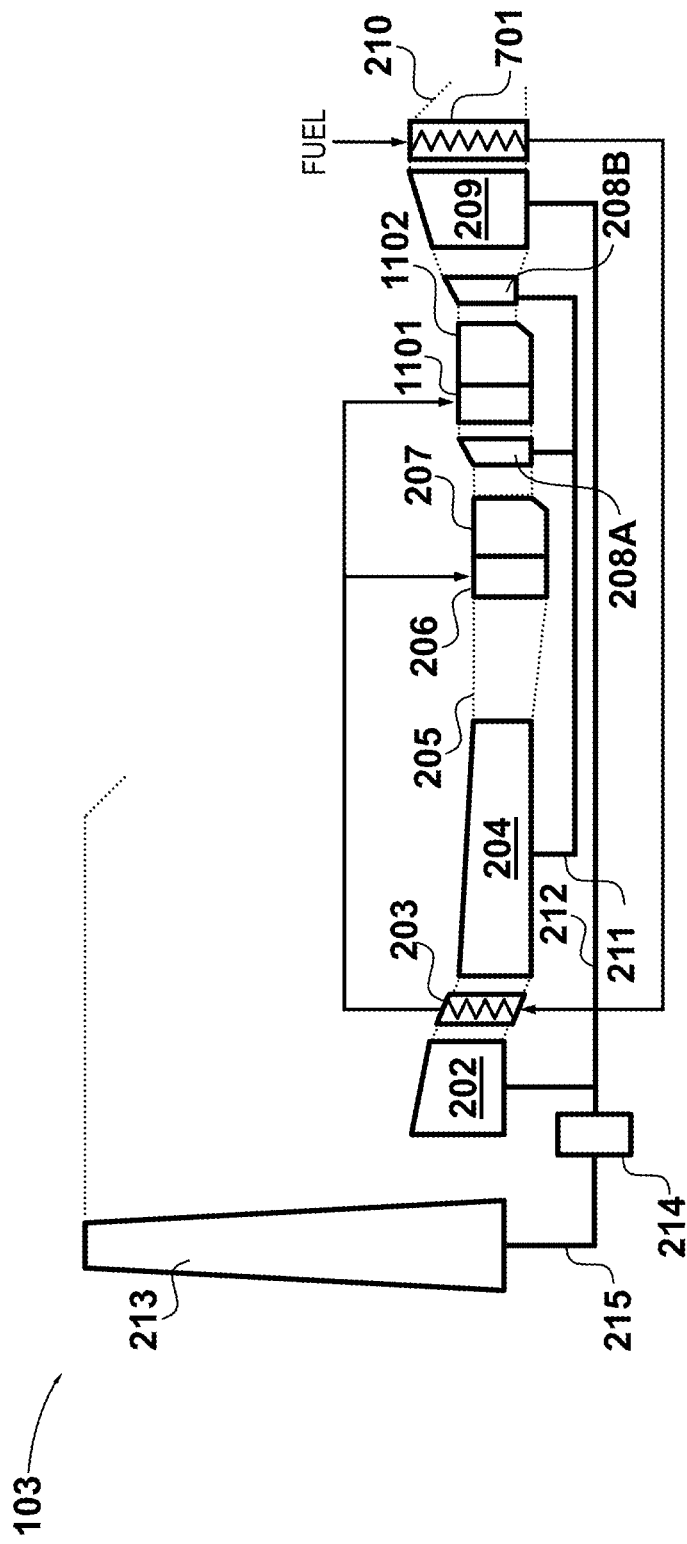
FIG. 11 shows another complex cycle including an intercooler, recuperation and inter-turbine reheat.

Additionally or alternatively, as shown in FIG. 11 a sequential combustion arrangement may be implemented to facilitate inter-turbine reheat. It will be appreciated that reheat of this type comprises additional stages of combustion to raise temperatures back to a maximum cycle temperature after a first stage of expansion. Along with intercooling, this moves the overall engine cycle closer to an Ericsson cycle, improving thermal efficiency substantially. In this specific example, the high-pressure turbine 208 is a multi-stage turbine and a reheat fuel injection system 1101 and reheat combustor 1102 are stationed between two of the stages 208A and 208B of the high-pressure turbine 208. Alternatively, the reheat fuel injection system 1101 and reheat combustor 1102 may be stationed between the high-pressure turbine 208 and the low-pressure turbine 209.

Direct Fuel Injection System

Due to its wide flammability limits and reaction rates, there is significant risk of flashback in hydrogen fuel injection systems. Thus it is preferable to utilise the direct injection principle with low mixing times and high velocities, as opposed to attempting any form of premixing. In order to minimise formation of oxides of nitrogen, residence time at high temperate must also be minimised. These constraints therefore favour a miniaturisation of the individual fuel injectors, sometimes referred to as "micromix" injectors.

Figure 12B:
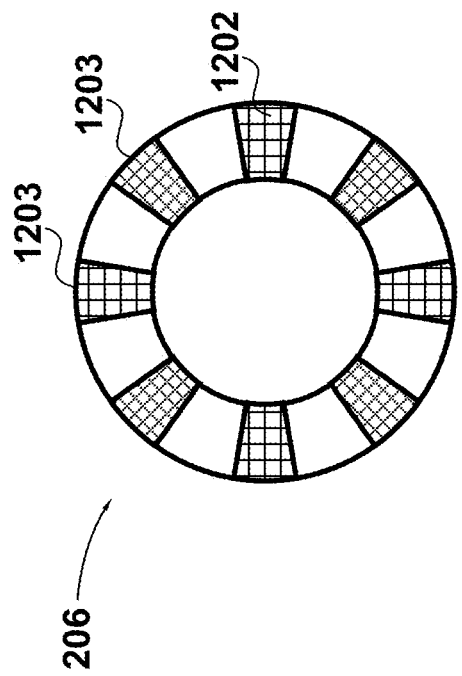
FIGS. 12A and 12B show two possible arrangements of the fuel injection system of the engines of FIG. 1.
Figure 12A:
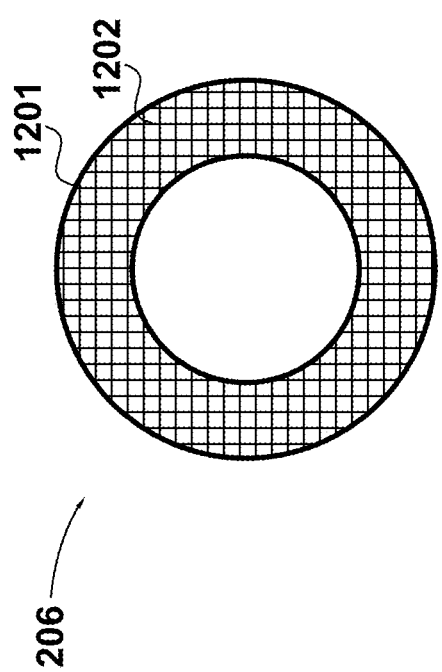

FIGS. 12A and 12B illustrate two possible arrangements of the fuel injection system 206. It will be appreciated that in the present embodiment the core gas turbine 105 employs an annular combustion system, and it will be clear how the principles disclosed herein may be adapted e.g. for tubular systems.

In the embodiment of FIG. 12A, the fuel injection system 206 comprises a full annulus 1201 of fuel injector blocks 1202. In the embodiment of FIG. 12B, the fuel injection system 206 comprises a plurality of sectors 1203 each comprising a subset of the totality of fuel injector blocks 1202. In both embodiments, the fuel injector blocks 1202 are configured with a geometry that substantially tessellates. It will be appreciated that the embodiment of FIG. 12A will produce a substantially more uniform circumferential heat-release profile, reducing the danger of hot streaks in the combustor 207 and uneven loading of the high-pressure turbine 208, improving performance by reducing cooling requirements.

It is contemplated that the fuel injection system 206 would comprise many hundreds or even thousands of fuel injector blocks 1202. For example, in an embodiment there are from 500 to 2000 fuel injector blocks, for example 1000 fuel injector blocks 1202.

A first configuration for the fuel injector blocks 1202 will be described with reference to FIGS. 13A to 15B. A second configuration for the fuel injector blocks 1202 will be described with reference to FIGS. 16 to 17B. A third configuration for the fuel injector blocks 1202 will be described with reference to FIGS. 18A to 20B.

Figure 13B:
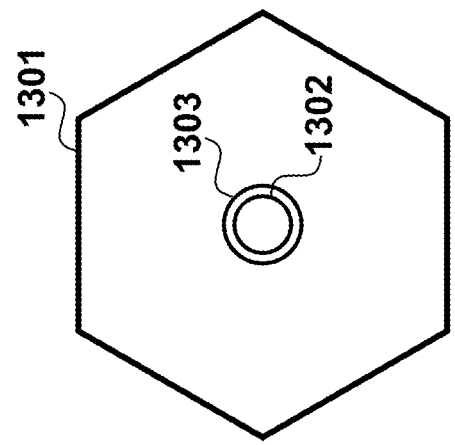
FIGS. 13A and 13B show two embodiments of a rim injector block.
Figure 13A:
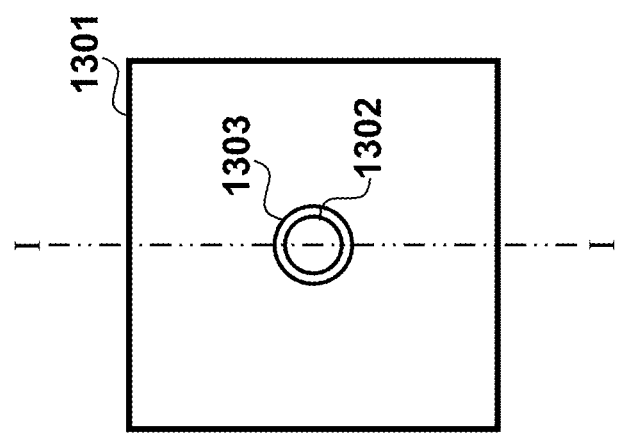

The first configuration for the fuel injector blocks is shown in FIGS. 13A and 13B, and will hereinafter be referred to as a rim injector block 1301. A first embodiment of the rim injector block 1301 is shown in FIG. 13A, and has a quadrilateral, specifically a square, outer profile in the plane of tessellation. Another embodiment is shown in FIG. 13B, and has a hexagonal, specifically a regular hexagon, outer profile in the plane of tessellation. It will be appreciated that other outer profiles that tesselate could be used. In this example, the rim injector block 1301 comprises an air admission duct 1302 and a fuel admission aperture 1303.

Figure 14A:
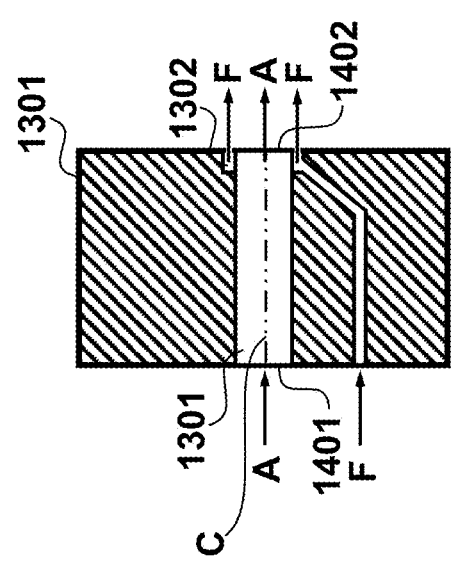
FIG. 14A shows the one configuration of the rim injector in cross section and FIG. 14B shows simulated equivalence ratios downstream of the rim injector of FIG. 14A.
Figure 14B:
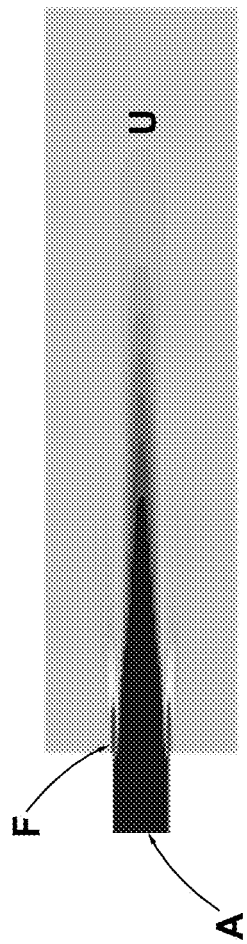

Referring now to FIG. 14A, which is a cross sectional view on I-I of FIG. 13A, the air admission duct 1302 has an inlet 1401 for receiving air A from the diffuser 205 and an outlet 1402 for delivering air into a mixing zone in the combustor 207. The air admission duct 1302 has a central axis C extending from the inlet 1401 to the outlet 1402. The fuel admission aperture 1303 is located around the periphery of the outlet 1402 and is configured to inject hydrogen onto a jet shear layer formed at the outlet 1302 for mixing in the mixing zone. In the embodiment of FIG. 14A, the fuel admission aperture 1303 is configured to inject hydrogen fuel parallel to the central axis C, as shown by arrows F. FIG. 14B shows the equivalence ratios downstream of the rim injector block 1301, and was obtained by a periodic isothermal CFD simulation on this configuration. The air admission duct 1302 was sized with a 6 millimetre diameter. In this example, a uniform equivalence ratio U was achieved within 80 millimetres of the injection point.

Figures 15A, 15B:
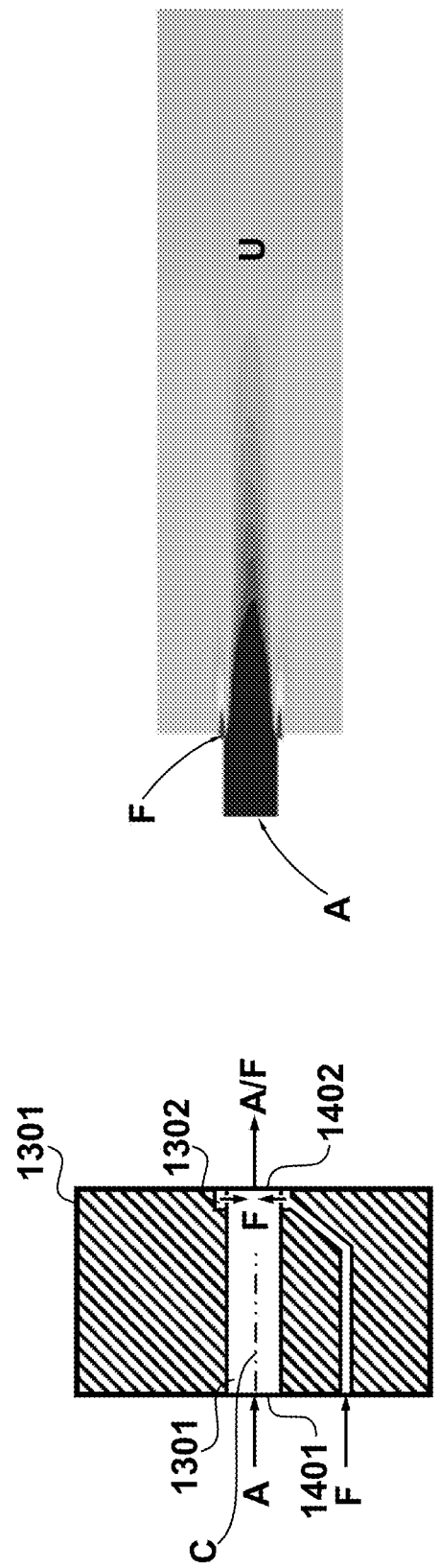
FIG. 15A shows the one configuration of the rim injector in cross section and FIG. 15B shows simulated equivalence ratios downstream of the rim injector of FIG. 15A.

An alternative configuration of the rim injector block 1301 is shown in FIG. 15A, in which the fuel admission aperture 1303 is configured to inject hydrogen fuel perpendicular to the central axis C, as shown by arrows F. FIG. 15B shows the results of a periodic isothermal CFD simulation on this configuration. Again, the air admission duct 1302 had a 6 millimetre diameter and a uniform equivalence ratio U was achieved within 80 millimetres of the injection point.

In both configurations, the injection of fuel onto the jet shear layer from the fuel admission aperture 1303 minimises flammable mixtures at velocities lower than the turbulent flame speed close to the injector. This reduces the risk of flashback.

Figure 16:
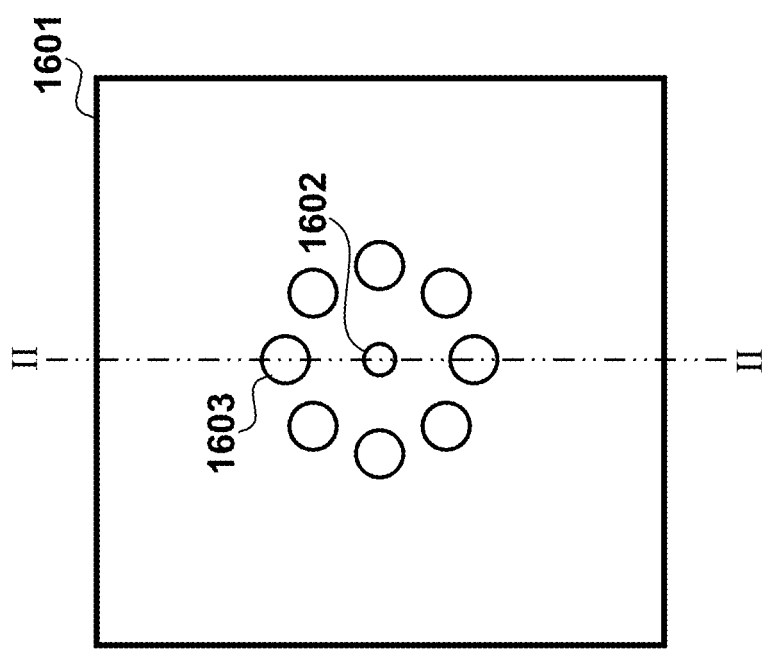
FIG. 16 shows an embodiment of a converging jet injector block.

A second configuration for the fuel injector blocks is shown in FIG. 16, and will hereinafter be referred to as a converging jet injector block 1601. The converging jet injector block 1601 comprises a fuel admission duct 1602 and a plurality of air admission ducts 1603 distributed around the air admission duct. In this specific embodiment, the air admission ducts 1603 are equidistant from the fuel admission duct 1602. As described previously, the outer profile of the injector block may be configured such that multiple blocks substantially tesselate adjacent to one another.

Figure 17B:
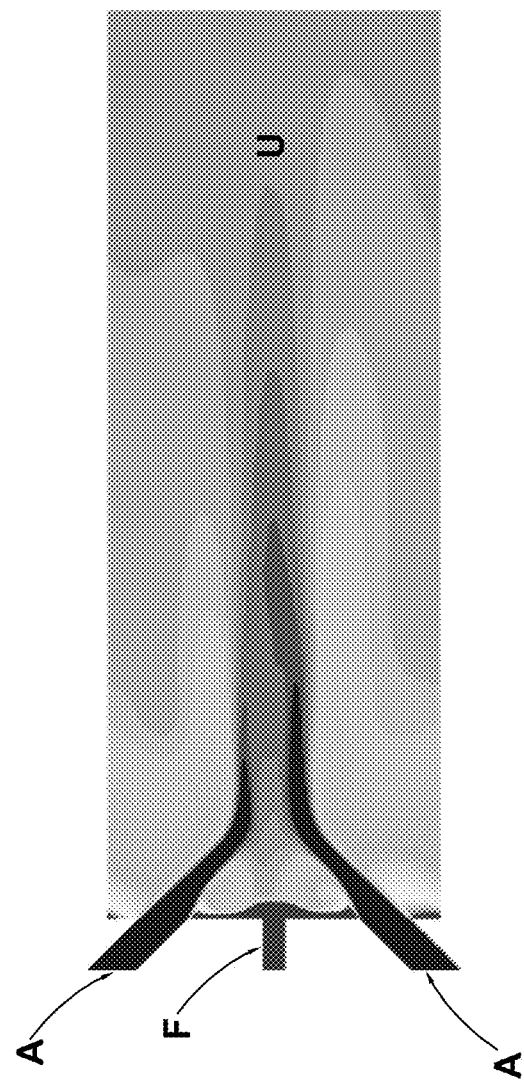
FIG. 17A shows the converging jet injector block in cross section and FIG. 17B shows simulated equivalence ratios downstream of the converging jet injector block of FIG. 17A.
Figure 17A:
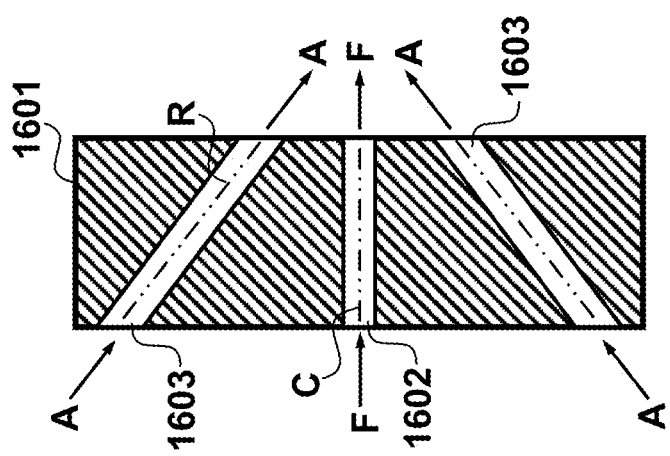

Referring now to FIG. 17A, which is a cross-sectional view on II-II of FIG. 16, the fuel admission duct 1602 has a central axis C and each air admission duct 1603 has its own respective axis R defined between each duct's respective inlet and outlet. In the present embodiment, the fuel admission duct 1602 and air admission ducts 1603 are configured to respectively admit fuel and air without swirl. The respective axis R of each air admission duct 1603, is inclined towards the central axis C of the fuel admission duct 1602, such that emerging fuel F converges on the air A in the mixing zone.

FIG. 17B shows the equivalence ratios downstream of the converging jet injector block 1601, and was obtained by a periodic isothermal CFD simulation on this configuration. In this example, the fuel admission duct 1602 was sized with a 0.5 millimetre diameter and the air admission ducts 1603 were sized with a 0.8 millimetre diameter. A uniform equivalence ratio U was achieved within 30 millimetres of the injection point.

Figure 18B:
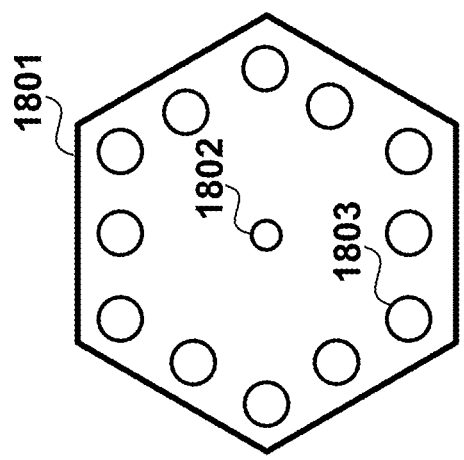
FIGS. 18A and 18B show two embodiments of a jet matrix injector block.
Figure 18A:
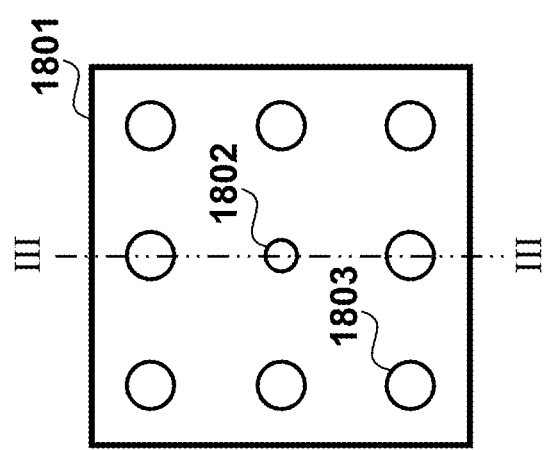

A third configuration for the fuel injector blocks is shown in FIGS. 18A and 18B, and will hereinafter be referred to as a jet matrix injector block 1801. The converging jet injector block 1801 comprises a fuel admission duct 1802 and a plurality of air admission ducts 1803 distributed around the air admission duct. In the present embodiment, the fuel admission duct 1802 and air admission ducts 1803 are configured to respectively admit fuel and air without swirl.

In FIG. 18A, the outer profile of the jet matrix injector block 1801 is a quadrilateral and in FIG. 18B it is a hexagon.

In an embodiment, the jet matrix injector block 1801 comprises a number 2N of air admission ducts 1803 that meet the following criteria: 2N is even and equal to 6 or more, i.e. 2N≥6. Thus for example in FIG. 18A it can be seen that N=4 and thus there are 8 air admission ducts 1803, whilst in FIG. 18A it can be seen that N=6 and thus there are 12 air admission ducts 1803.

The air admission ducts 1803 are then distributed around the fuel admission duct 1802 such that they lie on the periphery of an N-gon (i.e. a polygon with N sides) centred on the central axis C of the fuel admission duct 1802. In a specific embodiment, N of the air admission ducts 1803 are arranged at a respective vertex of the N-gon, and the other N of the air admission ducts 1803 are arranged on a respective edge of the N-gon. For example, the other N of the air admission ducts 1803 may be arranged at the midpoint of their respective edge.

Taking FIG. 18A as a worked example, N=4, therefore there are 2N=8 air admission ducts 1803. These are located on the periphery of a 4-gon, i.e. a square. Four of the air admission ducts 1803 are located at the vertices (i.e. the corners) of the square, and the other four are located on a respective edge of the square. In this example they are located at a midpoint of the edges.

Figure 19B:
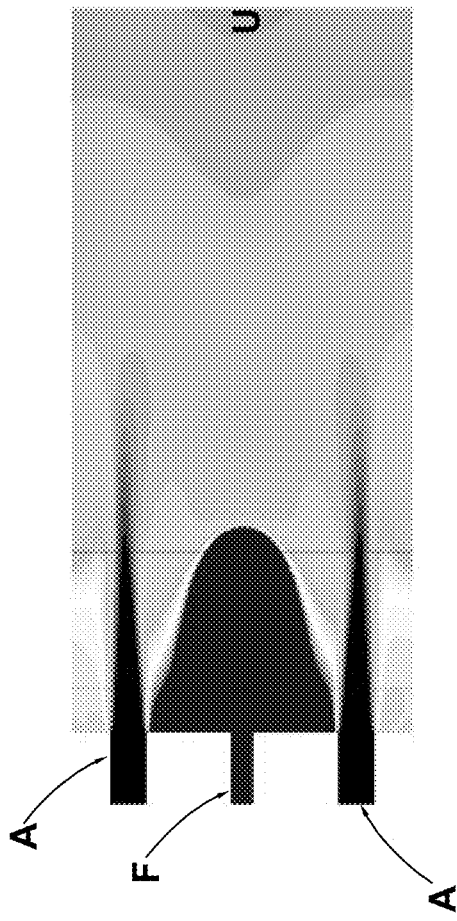
FIG. 19B shows simulated equivalence ratios downstream of the jet matrix injector block of FIG. 19A.
Figure 19A:
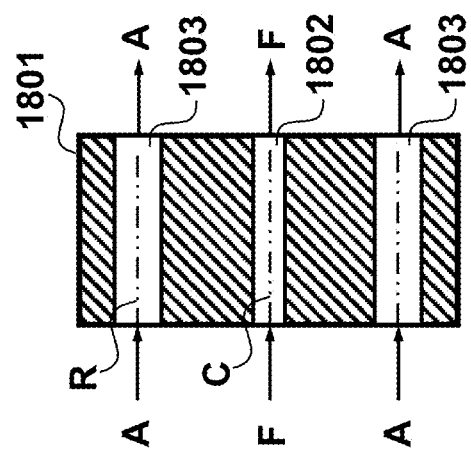
FIG. 19A shows the jet matrix injector block in cross section.

FIG. 19A is a cross-sectional view on III-III of FIGS. 18A and 18B, in which it may be seen that in this embodiment the air admission ducts 1803 are configured to lie parallel to the fuel admission duct 1802. Thus, each air admission duct 1803 has a respective axis R defined between each duct's inlet and outlet, whilst the fuel admission duct 1802 has a central axis C defined between its inlet and outlet. The respective axes R of the air admission ducts 1803 are parallel with the central axis C.

FIG. 19B shows the equivalence ratios downstream of the jet matrix injector block 1901, and was obtained by a periodic isothermal CFD simulation on this configuration. In this example, the fuel admission duct 1802 was sized with a 0.5 millimetre diameter and the air admission ducts 1803 were sized with a 0.8 millimetre diameter. A uniform equivalence ratio U was achieved within 10 millimetres of the injection point.

Figure 20B:
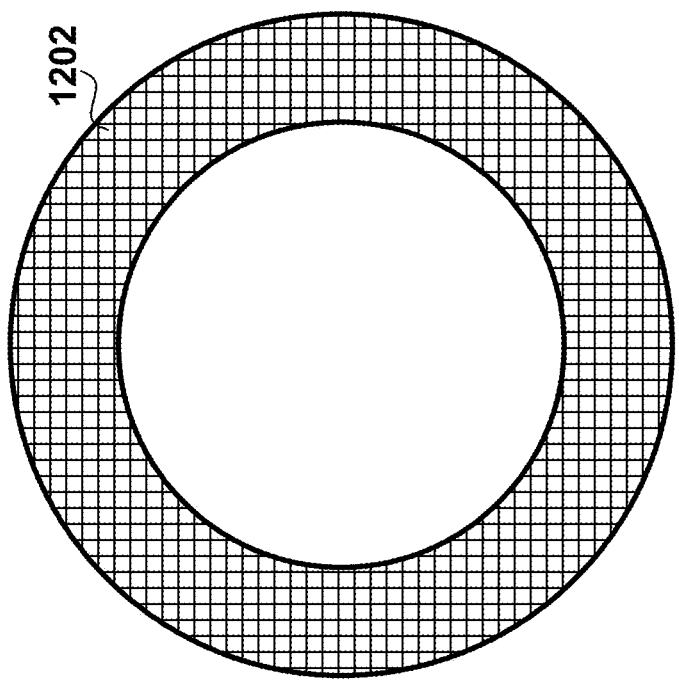
FIGS. 20A and 20B show the invariance of injector block size with power scaling of engine and fuel injection system.
Figure 20A:
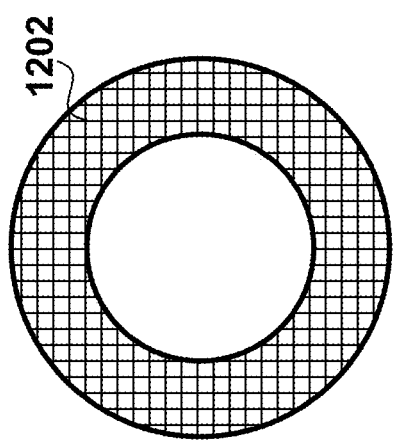

By defining fuel injector blocks 1202 of small scale relative to the overall size of the fuel injection system annulus, the flow field in the combustor 207 becomes self-similar and substantially invariant over different practical sizes. An example is shown in FIGS. 20A and 20B of how the core gas turbine 105 may undergo a power scaling, i.e. the use of a substantially common design for two different power levels. In this example, the fuel injection system 206 is sized for an engine with power P in FIG. 20A, and a power 2P in FIG. 20B. However, it will be seen that the size of the fuel injector blocks 1202 has not changed between the two designs, there has simply been an increase of the number making up the overall annulus.

Thus, in an industrial setting, the design process for a new specification engine may simply comprise obtaining a design of a standardised fuel injector block, such as blocks 1301, 1601 and 1801. The standard specification for such an injector block would comprise its capability in terms of fuel mass flow performance and its dimensions and geometry. Engine performance data, typically derived prior to detailed component design, would set the required fuel mass flow requirements for the new engine type.

A simple evaluation of the quantity of standardised fuel injector blocks that meets the fuel mass flow requirements for the engine may then be performed. This would not require any dimensional scaling of the standardised fuel injectors, and indeed this would be discouraged as the flow field would change.

Referring again briefly to FIG. 2, it can be seen that the adoption of a micromix-type direct fuel injection system as described herein facilitates a much shorter combustor 207. Thus for the same overall axial length of the core gas turbine 105, it is possible to increase the axial length available for the diffuser 205. In this way, improved control over the diffusion process may be achieved rather than the conventional dump diffuser designs utilised on conventional liquid-fuelled aero engines which require much longer combustor lengths due to the slower combustion processes associated with liquid hydrocarbon fuels. Thus in an embodiment, the axial length of the diffuser 205 is greater than the axial length of the combustor 207. In an embodiment, the diffuser is a faired diffuser which improves the uniformity of the flow delivered to the fuel injection system 206.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A complex cycle gas turbine engine for an aircraft with hydrogen fuel supply, comprising:
    in fluid flow series, a core gas turbine and a recuperator for heating hydrogen fuel prior to combustion by turbine exhaust products; and
    a fuel delivery system for delivering the hydrogen fuel from a cryogenic storage system to the recuperator, the fuel delivery system including a pump, a metering device, and a fuel heating system for heating the hydrogen fuel,
    wherein the metering device comprises a sonic fixed orifice configured to operate in a choked condition and a flow rate is controlled by adjusting pressure delivered by the pump upstream of the sonic fixed orifice based on a measured upstream temperature of the sonic fixed orifice and an area of the sonic fixed orifice,
    the fuel heating system comprises a vaporiser configured to vaporise liquid hydrogen from the cryogenic storage system, and
    the vaporiser comprises a fuel offtake for diverting a portion of the hydrogen fuel from a fuel conduit for combustion in a burner located in heat exchange relationship with the fuel conduit.

2. The gas turbine engine of claim 1, in which the core gas turbine engine comprises:
    a low-pressure spool having a low-pressure compressor driven by a low-pressure turbine;
    a high-pressure spool having a high-pressure compressor driven by a low high-pressure turbine.

3. The gas turbine engine of claim 2, further comprising a fan driven by the low-pressure spool, optionally via a reduction gearbox.

4. The gas turbine engine of claim 2, in which the core gas turbine comprises a combustor between the high-pressure compressor and the high-pressure turbine, the combustor having a liner cooled in a regenerative configuration by the hydrogen fuel.

5. The gas turbine engine of claim 2, further comprising a reheat combustor stationed between the high-pressure turbine and the low-pressure turbine.

6. The gas turbine engine claim 1, further comprising a fuel turbine for receiving heated hydrogen fuel from the spiral-wound recuperator to drive a load.

7. The gas turbine engine of claim 6, in which the load is:
    an electrical generator;
    a fuel pump for pumping the hydrogen fuel;
    a low-pressure spool or a high-pressure spool in the core gas turbine.

8. The gas turbine engine claim 2, further comprising an intercooler between the low-pressure compressor and the high-pressure compressor for cooling low-pressure compressor discharge air by the hydrogen fuel.

9. The gas turbine engine of claim 8, further comprising a second recuperator for further heating hydrogen fuel received from the intercooler.

10. The gas turbine engine of claim 9, in which the second recuperator is stationed downstream of the recuperator.

11. The gas turbine engine of claim 1, further comprising a reheat combustor.

12. The gas turbine engine of claim 11, in which the core gas turbine comprises a multi-stage turbine and the reheat combustor is stationed between two of the stages on the turbine.

13. The gas turbine engine of claim 1, in which the vaporiser comprises a boil volume or an electric heating element for initial heating of liquid hydrogen if no vaporised hydrogen fuel is available.

14. The gas turbine engine of claim 1, in which the flow rate is further controlled by varying the pressure ratio across the orifice.

15. The gas turbine engine of claim 1, in which the fuel heating system comprises one or more heat exchangers for heating the hydrogen fuel by heat from the core gas turbine.

16. The gas turbine engine of claim 1, in which one or more heat exchangers are oil-fuel heat exchangers for cooling engine oil or gearbox oil by the hydrogen fuel.

17. The gas turbine engine of claim 1, wherein the sonic fixed orifice comprises an exit with no expansion.

18. The gas turbine engine of claim 1, wherein a ratio of upstream to downstream pressures of the sonic fixed orifice is at least the critical pressure ratio of hydrogen.

19. The gas turbine engine of claim 1, wherein the recuperator is a spiral-wound recuperator.

* * * * *